(12) United States Patent
Doric

(10) Patent No.: US 12,394,336 B2
(45) Date of Patent: Aug. 19, 2025

(54) DUMMY WITH A DRIVE OF A LIMB IN THE LIMB ITSELF

(71) Applicant: MESSRING GmbH, Gilching (DE)

(72) Inventor: Igor Doric, Ingolstadt (DE)

(73) Assignee: MESSRING GmbH, Gilching (DE)

( * ) Notice: Subject to any disclaimer, the term of this patent is extended or adjusted under 35 U.S.C. 154(b) by 330 days.

(21) Appl. No.: 18/148,007

(22) Filed: Dec. 29, 2022

(65) Prior Publication Data

US 2023/0215297 A1   Jul. 6, 2023

(30) Foreign Application Priority Data

Dec. 30, 2021 (DE) .................. 10 2021 006 488

(51) Int. Cl.
*G09B 23/32* (2006.01)
*G01M 17/007* (2006.01)

(52) U.S. Cl.
CPC ......... *G09B 23/32* (2013.01); *G01M 17/0078* (2013.01)

(58) Field of Classification Search
CPC ........................... G09B 23/32; G01M 17/0078
See application file for complete search history.

(56) References Cited

U.S. PATENT DOCUMENTS

| 10,981,527 | B2 | 4/2021 | Verschut et al. |
| 2004/0164697 | A1* | 8/2004 | Iribe ............. B25J 13/085 318/568.12 |
| 2005/0066705 | A1 | 3/2005 | Choi |
| 2011/0027767 | A1* | 2/2011 | Divinagracia ......... G09B 23/32 434/274 |

FOREIGN PATENT DOCUMENTS

| DE | 102012207567 A1 | 11/2013 |
| DE | 102016110223 A1 | 12/2016 |
| DE | 112015004252 T5 | 6/2017 |
| EP | 2709739 B1 | 7/2018 |
| WO | 0160474 A2 | 8/2001 |

* cited by examiner

*Primary Examiner* — Timothy P Graves
(74) *Attorney, Agent, or Firm* — The Webb Law Firm

(57) ABSTRACT

The invention relates to a dummy object for testing the operationality of driver assistance systems or emergency braking systems in motor vehicles or rail vehicles. The dummy object is configured to be made to collide with a test object in a test of an emergency braking system, having a torso and at least one limb. The limb is coupled to the torso and is connected to be movable with respect to the torso by way of a first joint unit, and having at least one first electric drive unit. The first electric drive unit is configured to move the limb relative to the torso. It is provided according to the invention that the first electric drive unit forms an integrated structure with the limb.

16 Claims, 2 Drawing Sheets

DUMMY WITH A DRIVE OF A LIMB IN THE LIMB ITSELF

CROSS REFERENCE TO RELATED APPLICATION

This application claims priority to German Patent Application No. 10 2021 006 488.7, filed Dec. 30, 2021, the disclosure of which is hereby incorporated by reference in its entirety.

BACKGROUND OF THE INVENTION

Field of the Invention

The present invention relates to a dummy object for testing the operationality of driver assistance systems in motor vehicles.

Description of Related Art

Generic dummy objects are used in particular in the development and testing of driver assistance systems in motor vehicles for pedestrian detection. In the course of development, motor vehicles are tested on test routes in interaction with the sensors and algorithms used while simulating standardized critical traffic situations. The dummy objects are used as test objects and represent a real pedestrian or other type of road user for the vehicle sensors. An important factor for the realistic replication of the dummy objects to be recognized is the possibility of a lifelike motion within the test scenario. For example, dummy objects on a scooter or other vehicles that require arm and/or leg motion are also used. Animals that stand on the road or move across the road are also represented by dummy objects that mimic a realistic motion of their locomotion.

A dummy object is known, for example, from EP2709739B1. It describes a dummy object with a head, a torso, a skeleton, and movable arms and legs. Arms and legs can be set in motion by a drive unit such that the resulting motion pattern is similar to that of a person striding, walking or running.

A further dummy object is known from DE102012207567B4.

It is known from prior art that the drive unit required for moving the legs and arms is arranged in the torso of the dummy object, as described, for example, in EP2709739B1 and in DE10201220756764. A further possibility is to provide the drive unit outside of the dummy object, as is known, for example, from DE102008025539A1.

If the drive unit for moving the arms and legs of the dummy object is arranged outside the dummy object, a mechanical connection between the drive unit and the arms and legs of the dummy object is required. The consequence of this is that the device required to create the relative motion of the dummy object has to be configured to be more complex. A further drawback is that the dummy object is not able to move arms and legs independently of the device, which severely limits the flexibility of use of the dummy object.

It is known that a movable platform on which the dummy object is mounted in an upright position can be used to generate the relative speed of the dummy object. To test the operational quality of driver assistance systems, in particular of emergency braking systems as a subsystem of the driver assistance system, collision scenarios between two road users, for example, between the motor vehicle to be tested and a pedestrian, are brought about on a test track. The dummy object simulates a real human being for the sensor system of the motor vehicle. The collision scenario is created in that the motor vehicle to be tested moves at a predetermined speed along a predetermined distance. The motion of the dummy object relative to the motor vehicle to be tested is carried out such that the dummy object and the motor vehicle collide at a predetermined location if the emergency braking system does not correctly assess this critical situation. These standardized test procedures are designed such that the collision between the motor vehicle and the dummy object can be averted if the driver assistance system is operating properly. Driver assistance systems under development naturally do not operate flawlessly, so that a collision between the motor vehicle and dummy object occurs frequently in test situations of this kind and the dummy object is consequently exposed to high mechanical loads. In such collisions, the dummy object is typically struck in the legs and impacts the hood or windshield of the vehicle with its upper body and head. As a result, collisions cause damage to the motor vehicle and to the dummy object. In order to be able to continue such tests even after a collision, it is advantageous to have the dummy objects be designed such that they, firstly, cause as little damage as possible to the motor vehicle in the event of a collision and, secondly, remain undamaged and fully operational themselves. In the event of damage to the dummy object, there should be a way to repair the damage without having to replace the entire dummy object.

It is known from prior art to encase the dummy objects with an appropriately soft material in order to reduce damage to the test vehicle in the event of a collision, and to use the casing to replicate the necessary human contours. In order to avert damage from the dummy object in a collision and in particular to ensure its operationality in the form of the motion of the legs or arms, it is also known to attach the legs to the torso such that the connection is released when external forces are applied, for example, in the form of a collision with a vehicle. The drawback of the existing solutions is that the dummy objects exhibit unfavorable weight distribution because the torso is usually very heavy. In the event of a collision with a motor vehicle, the body of the dummy object will impact the hood or the windshield of the vehicle, depending on the speed. Since the windshield is a component relevant to safety, the test vehicle can no longer be used once it is damaged.

SUMMARY OF THE INVENTION

The object of the present invention is therefore to provide a dummy object for testing driver assistance systems in motor vehicles which can be used flexibly while having a low complexity, exhibits optimized weight distribution, and can absorb the highest possible loads without damage.

The object is satisfied by the features as described herein. According thereto, the object is satisfied according to the invention when the drive unit, which is provided for moving a limb relative to the torso, forms an integrated structure with the limb itself.

Advantageous embodiments of the present invention are described herein.

Within the present invention, the term "limb" defines an extremity that is movable relative to the torso. For example, a lower limb could mean a leg of a human being or animal and an upper limb could describe an arm of a human being or animal.

In the context of the present invention, an integrated structure is understood to mean an arrangement of at least two components according to a structural component, which can be connected as a whole to another part or a second structural component and separated again without the assembly or disassembly of individual components of the structural component described as an integrated structure being necessary.

According to a particularly advantageous embodiment of the present invention, the limb comprises an end remote from the torso and an end close to the torso. The limb length is defined by the maximum distance between the limb end close to the torso and the limb end remote from the torso. The limb comprises a proximal limb portion and a distal limb portion. The first electric drive unit is installed within the proximal limb portion at a distance from the end close to the torso of at most 50% of the length of the limb. Preferably the distance is at most 25%, more preferably at most 15% of the length of the limb. The arrangement of the first electric drive unit as an integrated structure with the proximal limb portion ensures optimized weight distribution within the limb. The closer the first electric drive unit is installed to the end of the limb close to the torso, the lower the mass inertia of the limb when moving relative to the torso. It is also conceivable to integrate at least part of the drive unit into the joint unit between the torso and the limb in order to further optimize weight distribution. Another advantage resulting from this can be seen in the fact that the drive unit has to perform less work due to the optimized mass inertia and can therefore be designed to be smaller, lighter and cheaper.

According to a further advantageous embodiment, the distal limb portion and the proximal limb portion are articulated to one another. A second drive unit is installed and is configured to move the distal limb portion relative to the proximal limb portion. The second drive unit is preferably located within the proximal limb portion so as to achieve advantageous weight distribution. It is also conceivable to install the second drive unit inside the distal limb portion, where the second drive unit is advantageously arranged as close as possible to the second joint unit for the proximal limb portion. The second drive unit is preferably the part of the integrated structure comprising the limb and the first drive unit.

According to a further advantageous embodiment, the limb comprises a first motion element which is configured to transmit the motion of the first drive unit and for moving the limb relative to the torso. The first motion element can be part of a mechanism for mechanical force and motion transmission and can be configured such that the type and speed of motion change. The first motion element is preferably part of the integrated structure that comprises the limb and the associated drive.

According to a further advantageous embodiment, the joint unit between the torso and the limb comprises a coupling element on the torso side and one on the limb side, where the coupling element on the torso side and the one on the limb side are configured to couple the torso and the limb to one another. The two coupling elements are preferably configured such that they form a positive-fit connection and the connection is secured against rotation and that they establish a magnetic connection between the torso and the limb and then allow for the limb to be easily separated from and connected to the torso. This advantage not only has an effect when assembling and dismantling the dummy object, but also in the event of a crash of the dummy object with a test vehicle, where the torso and the limb are separated from each other in a non-destructive manner due to the magnetic connection and damage to the dummy object is thus reduced or avoided altogether.

According to a further advantageous embodiment, the limb comprises a second motion element which is configured to transmit the motion of the second drive unit to the distal limb portion. The second motion element can be part of a mechanism for mechanical force and motion transmission and can be configured such that it changes the type and speed of motion. It is conceivable that the second motion element is part of the integrated structure that comprises the limb and the associated drive. The second motion element is preferably configured as a belt, and more preferably the belt is configured to step down the motion of the second drive unit. For example, the belt can be tensioned on a first and a second belt pulley, where the first belt pulley is driven by the second drive unit and the second belt pulley transmits the motion to the distal limb portion.

The dummy object according to a particularly advantageous embodiment of the present invention comprises a control unit that is configured to move the limb according to a predetermined and changeable motion pattern, where the motion pattern is suitable for simulating the motion of a human limb or the motion of an animal limb. The motion pattern substantially represents a to-and-fro motion of the limbs relative to the torso. The motion patterns can differ there in terms of the motion speed and the maximum deflection of the limb relative to the torso. The control unit can be arranged, for example, in the torso of the dummy object. However, it is also conceivable that the control unit is installed within the limb. If the present invention is configured with an articulated connection between the proximal limb portion and the distal limb portion and with a second drive unit, then the control unit can be configured such that the relative motion between the proximal and the distal limb portions in combination with the relative motion between the proximal limb portion and the torso forms the motion pattern.

According to a further advantageous embodiment of the present invention, the dummy object comprises at least two limbs. The control unit can be arranged in the torso and is configured to move the limbs relative to the torso and to synchronize their motions. The motion of the limbs can be independent of each other. It is also conceivable that one of the limbs does not move at all. In an advantageous embodiment, the two limbs form two lower limbs of a human being, where the respective distal limb portion is articulated to the proximal limb portion. The motion patterns of the individual limbs together form a gait pattern of a human being, for example, the gait pattern of a human being walking or a human being running. However, it is also conceivable that one of the limbs forms an upper limb of a human being and the other a lower limb of a human being. The synchronized motion of the lower and the upper limb can be used, for example, to simulate a simplified two-dimensional gait pattern of a human being.

According to a particularly advantageous embodiment of the present invention, the dummy object comprises four limbs, where two limbs represent the arms and two limbs represent the legs of a human being, where the control unit is configured to synchronize the motion of the limbs such that a gait pattern of the human being is simulated. However, it is not necessary for each of the limbs to comprise a drive unit. For example, to simulate the motion of a human being on a kick scooter, only the motion of one leg is required, since the arms are in a static connection to the handlebars of the kick scooter and the leg that is not needed to propel the scooter is standing on the scooter in a stationary manner. It is also conceivable that the scooterist is modeled with only one limb and the contours of the arms and the standing leg are designed as part of the torso. The driven limb then simulates the push-off motion of the scooterist. The four limbs of a dummy object can also represent four legs of an animal, for example, those of a deer. If an animal standing on the street is to be replicated within the test scenario, moving the limbs can also be dispensed with altogether. However, when the animal moves across the road, the four limbs move in sync with the type of motion of the animal.

The limb according to a further advantageous embodiment of the present invention comprises a casing, where the casing is designed such that it protects the integrated structure of the limb from external mechanical influences. It is provided within the test scenarios that the test vehicle uses the driver assistance systems to recognize the dummy object on the road and prevents a collision with the dummy object by intervening in the braking and/or steering system of the vehicle. However, it happens frequently that the test vehicle and dummy object collide, especially in the development phase of the assistance system. The casing is designed such that it prevents or at least reduces damage to the limb in the event of a collision with the test vehicle or with another test object and thereby ensures its operability. The casing is preferably made of a soft material so that the test vehicle as well is protected from major damage in the event of a collision.

According to a further advantageous embodiment of the present invention, the casing can be configured in a modular manner. It is conceivable that the outer contour of one casing corresponds to the leg of a human being and the outer contour of another casing to the leg of an animal, where both casings can be used on one and the same limb. This ensures that the limb can be used flexibly and that reshaping a limb is easy to manage without having to replace the entire limb for this. In order to ensure an even more realistic replication of the human limbs, it is also conceivable to configure the end of a limb that is remote from the torso, for example, as a foot or as a hand. According to a particularly advantageous embodiment of the present invention, the dummy object comprises at least one acceleration sensor, where the acceleration sensor is configured to determine the acceleration of the dummy object. In connection with the acceleration sensor of the dummy object, the control unit is configured to start the motion of the limb at the beginning of a test scenario and to end it at the end of the test scenario and to stop the motion in the event of a collision with the test object. The acceleration sensor can be installed into the torso of the dummy object, but it is also conceivable that the acceleration sensor is integrated into the limb. It is also conceivable that the acceleration sensor is also configured to detect the current orientation of the dummy object, so that there is the possibility of allowing the dummy object to move the limb only when the orientation is appropriate for the application. When running a test scenario, it is advantageous to begin the motion of the limb of the dummy object exactly when the dummy object has been set in relative motion to the road, where the relative motion is able to be created by way of a movable platform. If the relative motion stops again, the motion of the limb of the dummy object also ends. This has the advantage that no communication whatsoever is required between the dummy object and an external device for causing the motion of the limb. In the event of a collision of the dummy object with the test object, it is advantageous to stop the motion of the limb to prevent damage to the dummy object and ensure the operationality of the limb.

According to a particularly advantageous solution of the present invention, the limb comprises a power supply unit and a communication unit. They are preferably installed within the proximal limb portion and more preferably as close as possible to the first joint unit between the limb and the torso. The power supply unit can be configured, for example, as a battery. The integration of the electrical components into the limb of the dummy object allows for autonomous operation of the limb independently of the torso of the dummy object. As a result, the limb is not bound to a specific configuration of the torso, but can be operated with various configurations of a torso. It is also conceivable that the limb can be used both as an arm and as a leg of a human being, where the appropriate casing is can be used for the respective external design. Another advantage of the autonomous limb is that the entire limb can be replaced quickly and easily if the dummy object is defective or the battery is empty so that the test operation is not interrupted for an unnecessarily long time.

According to a further advantageous embodiment of the present invention, the communication unit can be configured to receive external information and forwarding it to the control unit. It is conceivable that the dummy object comprises more than one limb and each individual limb in addition to at least one drive unit comprises a control unit, a power supply unit, and a communication unit which are combined, for example, as a motion module within a limb. The synchronization of the motion modules and therefore the synchronization of the motion of the individual limbs can be effected wirelessly and in the manner of a master-slave system.

According to a further embodiment of the present invention, the control unit, the power supply unit, and the communication unit are arranged as central units in the torso of the dummy object. As a result, the number of electrical components can be reduced, but the advantage of autonomous operation of the limb cannot be implemented in this embodiment.

According to a further advantageous embodiment of the present invention, the connection between the limb and the torso is secured against loss by way of a loss prevention element, where the loss prevention element is preferably configured as an elastic band. If the dummy object is made to collide with the test object within a test scenario, it is advantageous to have the limb and the torso no longer be connected to one another by way of the first joint unit in order to minimize damage to the dummy object and test object. However, the connection between the limb and the dummy object is preferably not completely separated in the process, but remains in place by way of the loss prevention element.

According to a further advantageous embodiment of the present invention, the dummy object comprises a connection element that is configured to establish a connection to the device that creates a relative motion of the dummy object with respect to the environment. The connection element can be arranged, for example, on the torso and establish a connection with a support and motion system arranged above the dummy object. However, it is also conceivable for the dummy object to be connected to a mobile platform by way of a support bar. It is furthermore conceivable that the connection element is part of a limb that is not moved in the respective test scenario.

According to a particularly advantageous embodiment of the present invention, the limb is a head. The limb is configured to function in conjunction with an appropriate casing as a human head or as an animal head.

BRIEF DESCRIPTION OF THE DRAWINGS

An embodiment of the present invention shall be explained in more detail hereafter with reference to the following drawings, where.

DESCRIPTION OF THE INVENTION

Figure 1:
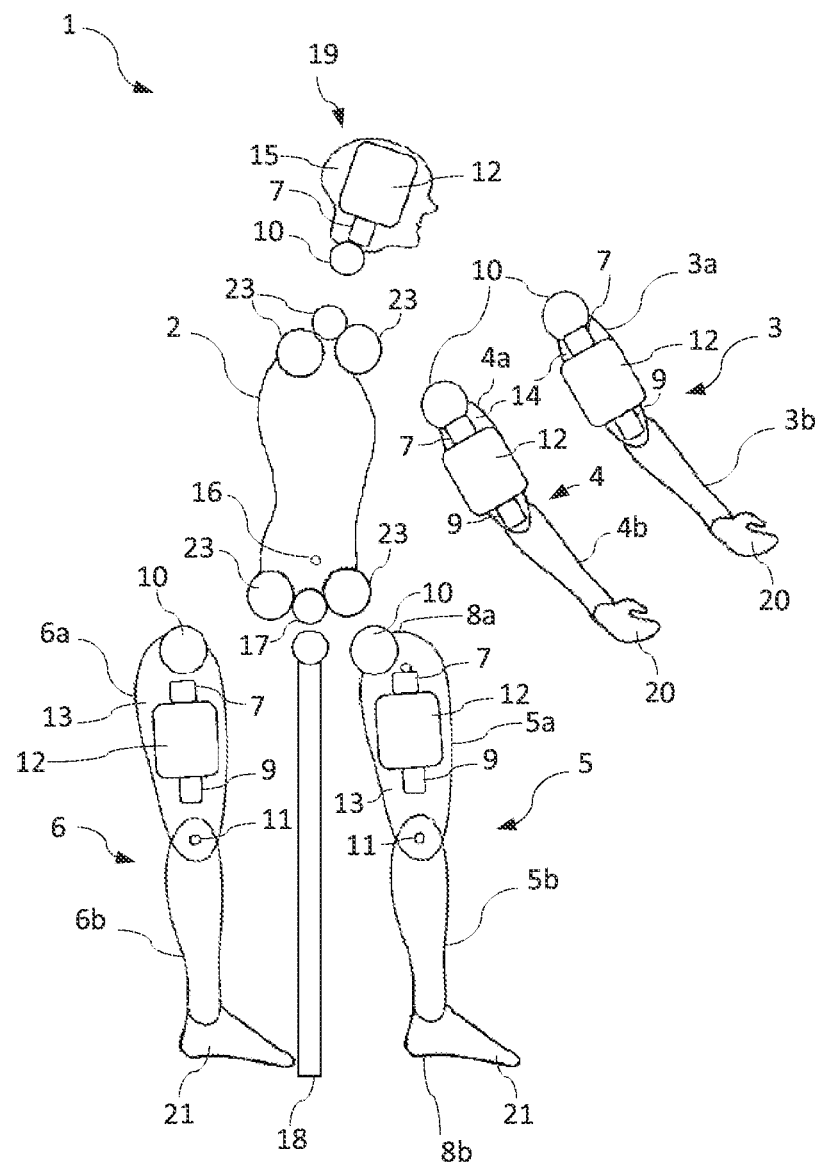
FIG. 1 shows a schematic representation of an embodiment of the present invention.

It applies to the following embodiments that like components are designated with like reference characters. Where a figure contains reference characters which are not explained in more detail in the associated figure description, then reference is made to preceding or subsequent figure descriptions.

FIG. 1 shows the schematic structure of dummy object 1 according to an embodiment of the present invention with a torso 2 and five limbs 3, 4, 5, 6 and 19, where two limbs 3 and 4 are configured as arms, two limbs 5 and 6 depict a leg, and one limb 19 represents a head. Limbs 3, 4, 5, 6 and 19 have an end 8a close to the torso and an end 8b remote from the torso which are shown by way of example on left leg 5 and are connected to torso 2 via a coupling element 23 on the torso side and a coupling element on the limb side shown in FIG. 2 as part of first joint unit 10. First joint unit 10 in the embodiment described according to the invention is implemented as a component of limb 6.

Limbs 3, 4, 5, 6 and 19 comprise a first drive unit 7 which forms an integrated structure with respective limb 3, 4, 5, 6 and 19 and where first drive unit 7 is configured to move respective limb 3, 4, 5, 6 and 19 relative to torso 2. First drive unit 7 is installed within proximal limb portion 3a, 4a, 5a, 6a at a distance from end 8a of the limb close to the torso of at most 50%, preferably at most 25% of the length of limb 3, 4, 5, 6, 19. The motion of first drive unit 7 is transmitted by way of a first motion element 25 which is part of a motion mechanism, where the motion of limb 3, 4, 5, 6 and 19 relative to torso 2 is induced via first joint unit 10.

Limbs 3, 4, 5 and 6 representing arms or legs are divided into a proximal limb portion 3a, 4a, 5a and 6a and a distal limb portion 3b, 4b, 5b and 6b and connected to each other by way of a second joint unit 11. A second drive unit 9 is installed in proximal limb portion 3a, 4a, 5a and 6a and is configured to move distal limb portion 3b, 4b, 5b and 6b relative to proximal limb portion 3a, 4a, 5a and 6a by way of a second motion element 26, where second drive unit 9 forms an integrated structure with first drive unit 7 and proximal limb portion 3a, 4a, 5a and 6a.

Dummy object 1 also comprises a dedicated control unit 12a for each limb 3, 4, 5, 6 and 19 which is presently shown as a sub-component of a motion module 12 and which is configured to control respective limb 3, 4, 5, 6 and 19 according to a predetermined and changeable motion pattern, where the motion pattern is suitable for simulating the motion of an arm 3 and 4, the motion of a leg 5 and 6, and the motion of a head 19 of a human being. Control unit 12a is also configured to synchronize the motion of limbs 3, 4, 5 and 6 and head 19. Proximal limb portions 3a, 4a, 5a and 6a are moved relative to torso 2 and distal limb portions 3b, 4b, 5b and 6b are moved relative to proximal limb portions 3a, 4a, 5a and 6a such that a human gait pattern is simulated and for this purpose head 19 executes a motion which can simulate, for example, looking around.

Limbs 3, 4, 5, 6 and 19 of dummy object 1 comprise a casing 13, 14 and 15 which is configured such that it protects the integrated structure of limb 3, 4, 5, 6 and 19 from external mechanical influence. Furthermore, the outer shape of the casing can be configured such that it can embody the outer shape of an arm 14 or of a leg 13 of a human being or of a limb of an animal. In order to obtain an even more realistic replication of the human limbs, the end (8b) of the corresponding limb that is remote from the torso is configured as a foot 21 or as a hand 20. Casing 15, which is intended to replicate a limb configured as a head 19, consequently corresponds to the external shape of a head of an animal or, as illustrated, the head of a human being.

Dummy object 1 also comprises an acceleration sensor 16 which is configured to determine the acceleration of dummy object 1. Control unit 12a is suitable for recognizing the beginning and end of a test scenario on the basis of the data provided by acceleration sensor 16 and for starting the motion of limbs 3, 4, 5, 6 and 19 accordingly at the start of the test and stopping it at the end of the test.

Dummy object 1 shown in FIG. 1 comprises a power supply unit 12b and a communication unit 12c as further components of motion module 12. As parts of motion module 12, power supply unit 12b and the communication unit 12c also form an integrated structure with proximal limb portion 3a, 4a, 5a and 6a of respective limb 3, 4, 5 and 6. Limb 19 configured as a head accordingly also comprises a motion module 12, where a subdivision into a proximal and distal limb portion is not appropriate in this embodiment of a limb. Limbs 3, 4, 5, 6 and 19 of dummy object 1 shown in FIG. 1 are configured such that they can be operated autonomously and do not require any electrical connection to torso 2. Energy supply unit 12b is configured as an electric battery and supplies the electrical components within a limb 3, 4, 5, 6 and 19 with electrical energy. If the battery is empty, entire limb 3, 4, 5, 6 and 19 can be replaced and the battery can be charged for the next use. External information can be received with the aid of communication unit 12c and forwarded among communication units 12c of respective limbs 3, 4, 5, 6 and 19.

In order to be able to move dummy object 1 relative to a road as part of a test scenario, a movable platform can be used on which dummy object 1 is fastened using a connection element 17 by way of a rod 18. Connection element 17 is configured such that it allows dummy object 1 to be connected to various devices for generating the relative speed of dummy object 1. Rod 18 is additionally configured such that the connection to the device generating the relative speed is released in the event of a collision of dummy object 1 with a test object in order to keep the damage caused by the collision as minor as possible.

Figure 2:
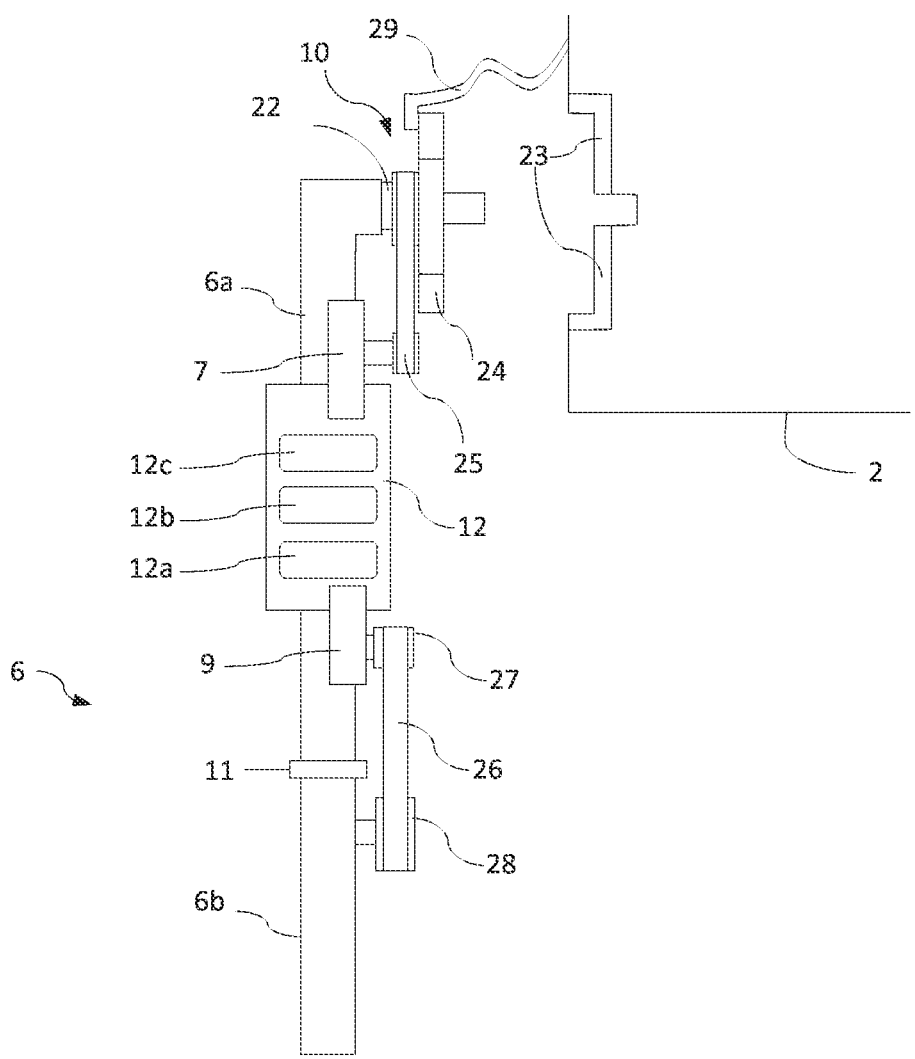
FIG. 2 shows a detailed view of the limb and the connection of the limb to the torso of the dummy object according to the invention.

FIG. 2 schematically shows a detailed structure of a limb 6 and its connection to torso 2. Distal limb portion 6b and proximal limb portion 6a are connected via a second joint unit 11. Proximal limb portion 6a forms an integrated structure together with control unit 12a, power supply unit 12b, and communication unit 12c, which are part of motion module 12, as well as with first drive unit 7 and second drive unit 9. Second drive unit 9 drives first belt pulley 27, where the motion is transmitted by belt 26 to second belt pulley 28 that is fixedly connected to distal limb portion 6b, thereby setting distal limb portion 6b in motion relative to proximal limb portion 6a.

Limbs 6 and torso 2 are connected to one another by coupling element 24 on the limb side and coupling element 23 on the torso side. Coupling element 24 on the limb side in FIG. 2 has an angular shape of the base area and a centering element, but can also be configured differently, where coupling element 23 on the torso side depicts the negative shape of the base area of coupling element 24 on the limb side, whereby coupling elements 23, 24 have an anti-rotation connection due to a positive-fit connection. Both coupling elements 23, 24 can comprise a magnet. However, in order to establish a magnetic connection between limb 6 and torso 2, it is also sufficient if only one of two coupling elements 23, 24 comprises a magnet and the other one comprises magnetic material. The configuration of two coupling elements 23, 24 ensures that the connection cannot twist and cannot come loose axially without a certain force being applied.

If limbs 6 and torso 2 are connected to one another, first drive unit 7 in cooperation with first motion element 25, which is configured as part of a belt drive in FIG. 2, ensures that limb 6 moves relative to torso 2. According to the embodiment described, the movable connection is configured as an axial bearing 22 within the first joint unit, a ball sleeve bearing or other forms of a movable connection are also conceivable.

Loss prevention element 29, which is configured as an elastic band, also ensures that limb 6 is secured against loss with respect to torso 2.

LIST OF REFERENCE CHARACTERS

1 dummy object
2 torso
3 left upper limb
3*a* proximal limb portion of the left upper limb
3*b* distal limb portion of the left upper limb
4 right upper limb
4*a* proximal limb portion of the right upper limb
4*b* distal limb portion of the right upper limb
5 left lower limb
5*a* proximal limb portion of the left lower limb
5*b* distal limb portion of the left lower limb
6 right lower limb
6*a* proximal limb portion of the right lower limb
6*b* distal limb portion of the right lower limb
7 first electric drive unit
8*a* limb end close to the torso
8*b* limb end remote from the torso
9 second drive unit
10 first joint unit
11 second joint unit
12 motion unit
12*a* control unit
12*b* power supply unit
12*c* communication unit
13 casing lower limbs
14 casing upper limbs
15 casing head
16 acceleration sensor
17 connection element
18 connection to the device generating the relative speed of the dummy object
19 head
20 hand
21 foot
22 axial bearing
23 coupling element on the torso side
24 coupling element on the limb side
25 first motion element
26 second motion element
27 first belt pulley
28 second belt pulley
29 loss prevention element

The invention claimed is:

1. A dummy object for testing the operationality of driver assistance systems or emergency braking systems in motor vehicles or rail vehicles, said dummy object being configured to be made to collide with a test object in a test of an emergency braking system, said dummy object comprising a torso and at least one limb, wherein said limb is coupled to said torso and is connected to be movable with respect to said torso by way of a first joint unit, said limb comprising at least one first electric drive unit, wherein said first electric drive unit is configured to move said limb relative to said torso, and wherein said first electric drive unit forms an integrated structure with said limb, and wherein said limb comprises a power supply unit and a communication unit, where said power supply unit and said communication unit form an integrated structure with said proximal limb portion, where said limb is configured such that it can be operated autonomously and no electrical connection to said torso is required.

2. The dummy object according to claim 1, wherein said limb comprises an end remote from said torso and an end close to said torso, wherein the maximum distance between the said end of said limb remote from said torso and said end of said limb close to said torso defines the length of said limb, wherein said limb comprises a proximal limb portion and a distal limb portion, and wherein said first electric drive unit is installed within said proximal limb portion at a distance from said end of said limb close to said torso of at most 50% of the length of said limb.

3. The dummy object according to claim 2, wherein said distal limb portion is connected to said proximal limb portion by way of a second joint unit, and wherein said limb comprises a second drive unit, wherein said second drive unit forms an integrated structure with said proximal limb portion, and wherein said second drive unit is configured to move said distal limb portion relative to said proximal limb portion.

4. The dummy object according to claim 1, wherein said limb comprises a first motion element which is configured to transmit the motion of said first drive unit and to move said limb relative to said torso, and wherein said first joint unit between said torso and said limb comprises a coupling element on the torso side and a coupling element on the limb side, where said coupling elements are configured to magnetically couple said torso and said limb.

5. The dummy object according to claim 3, wherein said limb comprises a second motion element which is configured such that the motion of said second drive unit is transmitted to said distal limb portion, wherein said second motion element is a belt.

6. The dummy object according to claim 1, wherein said dummy object comprises a control unit, wherein said control unit is configured to move said limb according to a predetermined and changeable motion pattern, wherein the motion pattern is suitable for simulating the motion of an extremity of a human being or the motion of an extremity of an animal.

7. The dummy object according to claim 6, wherein said dummy object comprises at least two limbs, and said control unit is configured such that the motion of said limbs can be synchronized.

8. The dummy object according to claim 7, wherein said dummy object comprises four limbs, wherein two limbs represent the arms and two limbs the legs of a human being, wherein said control unit is configured to synchronize the motion of said limbs such that a gait pattern of the human being is simulated.

9. The dummy object according to claim 1, wherein said at least one limb comprises a casing, wherein said casing is configured such that it protects the integrated structure of said limb from external mechanical influences and wherein said casing can be shaped such that it embodies the outer shape of a limb of a human being or the outer shape of a limb of an animal.

10. The dummy object according to claim 6, wherein said dummy object comprises at least one acceleration sensor, wherein said acceleration sensor is configured to determine the acceleration of said dummy object, wherein said control unit is configured to start the motion at the beginning of the test scenario and to end it at the end of the test scenario and to stop the motion in the event of a collision with the test object during the test scenario.

11. The dummy object according to claim 1, wherein said limb is secured against separation with respect to said torso by way of a loss prevention element.

12. The dummy object according to claim 11, wherein said loss prevention element is preferably configured as an elastic band.

13. The dummy object according to claim 1, wherein said dummy object comprises a connection element, where said connection element is configured to establish a connection to said device that creates a relative motion of said dummy object with respect to an environment.

14. The dummy object according to claim 1, wherein said limb is a head.

15. The dummy object according to claim 2, wherein said first electric drive unit is installed within said proximal limb portion at a distance from said end of said limb close to said torso of at most 25% of the length of said limb.

16. The dummy object according to claim 1, wherein said dummy object comprises at least one acceleration sensor, wherein said acceleration sensor is configured to determine the acceleration of said dummy object.

* * * * *